UNITED STATES PATENT OFFICE.

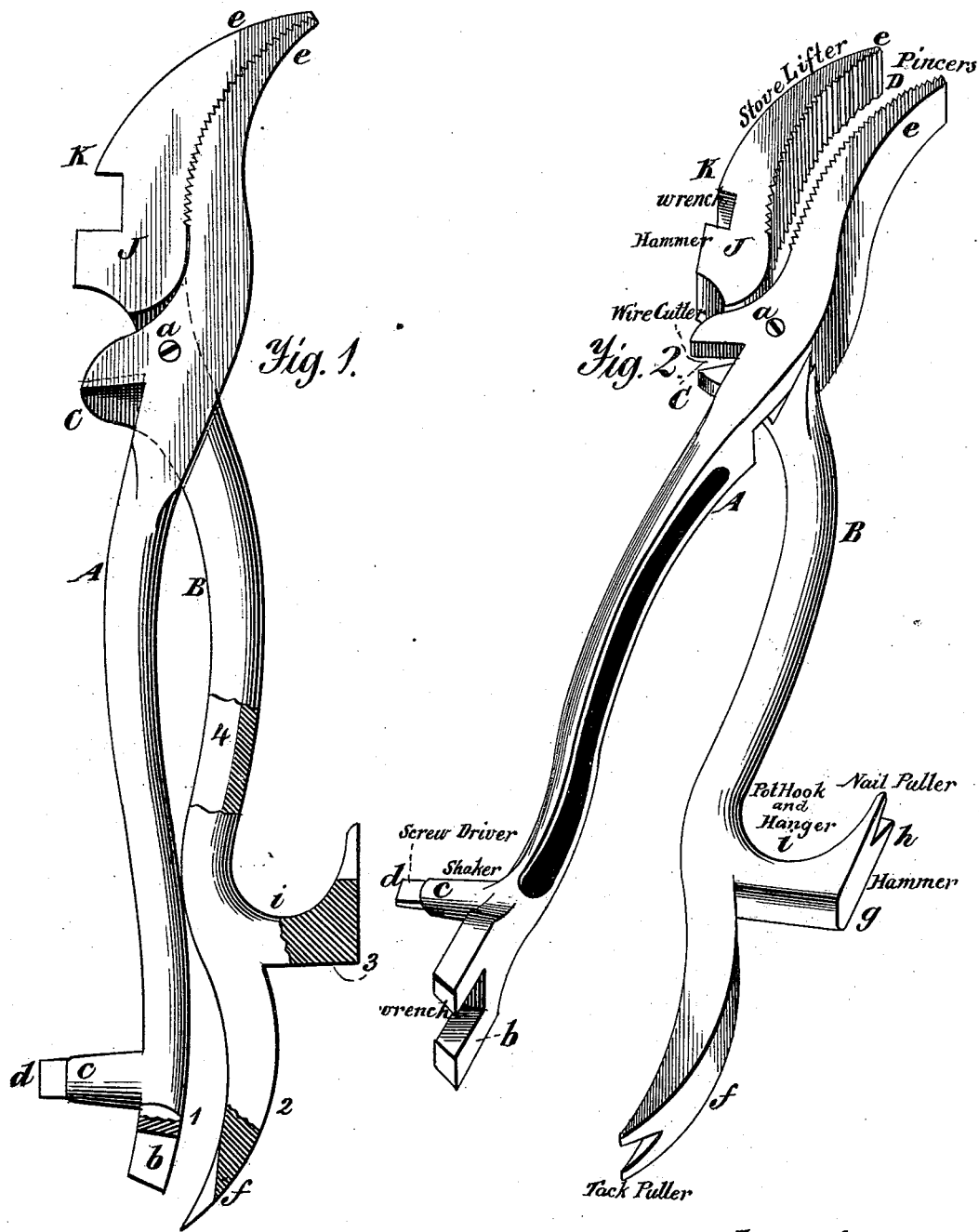

THOMAS B. TAYLOR, OF MILLERSBURG, OHIO.

COMBINATION-TOOL FOR HOUSEKEEPERS.

SPECIFICATION forming part of Letters Patent No. 271,000, dated January 23, 1883.

Application filed July 20, 1882. (No model.)

*To all whom it may concern:*

Be it known that I, THOMAS B. TAYLOR, of Millersburg, in the county of Holmes and State of Ohio, have invented certain new and useful Improvements in a Combination-Tool for Housekeepers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the class known as "combination-tools," and has for its object general utility and usefulness and the conversion of a single instrument to various purposes and uses.

To this end the invention consists in combining in a single tool or instrument for household uses a pinchers, a wrench and hammer, a screw-driver, a stove-grate shaker, a stove-lid lifter, a tack-puller, pot hook and hanger, and a nail-puller. At its joint and near its fulcrum it has a wire-cutter formed by the junction of the two handles. The instrument has two hammers and two wrenches, the various uses of all of which will be more fully hereinafter described.

Figure 1 is a plan view partly in section. Fig. 2 represents a perspective view, clearly showing all the parts.

The same letters will denote like parts in all the figures.

A B show bars or handles jointed and fulcrumed at *a*, each of these handles being constructed to form many of the tools independent of the other. For instance, handle A is provided with a wrench, *b*, a stove-shaker, *c*, and a screw-driver, *d*, at one of its ends, and at the other end has a stove-lifter, *e*. Handle B, independently of its mate, is provided at one end with a tack-puller, *f*, a hammer, *g*, nail-puller, *h*, and pot hook and hanger, *i*, and at its other end has a hammer, J, wrench K, and lifter *e*; and when combined it has all the above-named parts, and at their junction a wire-cutter, C, the fulcrum being at *a*. The handles A B are hollowed out for the purpose of making them lighter, and of course when made in this way they will require much less iron or material in their construction. The handles can be made round.

The portion representing the pinchers may be steeled on the face in the usual way for the better wearing of the teeth thereof. The same may be done with the wire-cutter C. It is obvious and preferable to make the combined tool of steel, but when made for ordinary uses good cast-iron will answer the purpose.

The pinchers portion D may be provided with corrugations for the purpose of crimping.

When the tool is to be used for the purpose of removing bread-pans or other pans from the oven of a stove or baking-ovens, the handles are taken hold of in the usual way, turning the curved or pinchers end downward, slightly opening it, then let one side be outside of the pan and the other side be placed inside thereof, then pressing the handles the pinchers close on the side of the pan, when the pan can be removed without injury to the hand of the attendant by heat. The same method may be adopted in replacing the pan in the oven.

The sectional portions, as shown on Fig. 1— *i.e.*, 1, 2, 3, and 4—are taken centrally through the parts shown in the section, whereby the thickness of the iron is indicated.

The manner of using the other tools is so obvious to housekeepers and others that any further description of them is deemed unnecessary.

If desired, a can-opener or shears could be substituted for the pinchers when the tool is not required for the kitchen.

Having described my invention, what I claim as new, and desire to secure by Letters Patent, is—

1. A combination-tool consisting of the pinchers D, forming both pinchers and stove-lid lifter, and a wrench and hammer, in combination with the jaws, forming the wire-cutter, substantially as described.

2. A combination-tool consisting of pinchers D *e e*, wrench K, and hammer J, wire-cutter C at one of its ends, and the other end provided with a pot hook and hanger, nail-puller *h*, and hammer *g*, substantially as described.

3. The combination, in a household-tool, of the wire-cutter C, combined screw-driver and shaker $c\ d$, wrench $b$, tack-puller $f$, hammer $g$, nail-puller $h$, and pot hook and hanger $i$, all arranged substantially as described.

4. A combination-tool consisting of handles A B, pinchers D, wrench K, hammer J at one of the ends of the tool, screw-driver $d$, and shaker $c$, wrench $b$, and nail-puller $h$, and hammer $g$ at its other end, for the purpose set forth and described.

In testimony that I claim the foregoing as my own I affix my signature in presence of two witnesses.

THOMAS B. TAYLOR.

Witnesses:
JOHN CORBUS,
EDWARD H. HULL.